RE 25775

Sept. 22, 1959 B. D. LOUGHLIN 2,905,749

SCREEN STRUCTURE FOR CONSTANT LUMINANCE COLOR RECEIVER

Filed May 18, 1953

2 Sheets-Sheet 1

Sept. 22, 1959 B. D. LOUGHLIN 2,905,749

SCREEN STRUCTURE FOR CONSTANT LUMINANCE COLOR RECEIVER

Filed May 18, 1953 2 Sheets-Sheet 2

2,905,749

SCREEN STRUCTURE FOR CONSTANT LUMINANCE COLOR RECEIVER

Bernard D. Loughlin, Lynbrook, N.Y., assignor to Hazeltine Research, Inc., Chicago, Ill., a corporation of Illinois Application May 18, 1953, Serial No. 355,637
8 Claims. (Cl. 178—5.4)

This invention relates to color-image-reproducing apparatus for a color-television receiver of the constant-luminance type, hereinafter referred to as a constant-luminance receiver.

Briefly considered, a constant-luminance receiver includes circuits for translating to color-image-reproducing apparatus a signal component primarily representative of the luminance of a composite color image to be reproduced and signal components primarily representative of the chromaticity thereof to reproduce the composite color image. The constant-luminance receiver preferably has parameters so proportioned that the chromaticity signal components applied to the image-reproducing apparatus jointly have substantially zero luminance value and, thus, do not affect the luminance of the reproduced image while controlling the chromaticity thereof. Constant-luminance receivers are more fully described and claimed in applicant's Patent No. 2,773,929 entitled "Constant Luminance Color-Television System," which issued on December 11, 1956. Constant-luminance receivers are also described in the October 1951 Proceedings of the I.R.E. in an article by applicant entitled, "Recent Improvements in Band-Shared Simultaneous Color-Television Systems," and in an article by Hirsch, Bailey, and Loughlin entitled, "Principles of NTSC Compatible Color Television," published in Electronics, February 1952.

Color-image-reproducing apparatus heretofore utilized in constant-luminance receivers ordinarily includes one or more cathode-ray tubes utilizing display-screen phosphors having persistence time constants which differ by factors of 100 to 1,000 and which have a maximum value approximately equal to the field-scanning period of the apparatus. The composite color image reproduced by such apparatus may be subject to undesirable luminance variations under some operating conditions which may appear, for example, as luminance streaks across the image. For example, when noise interference causes transient variations in the component of the received signal which synchronizes the so-called color subcarrier wave-signal generator of the receiver, the video-frequency chromaticity signal components derived in the receiver may include substantial signal components which degrade an instantaneous aspect of the constancy of luminance in a constant-luminance receiver utilizing color-image-reproducing apparatus of the type heretofore proposed. It will be understood, however, that constant-luminance receivers utilizing such prior image-reproducing apparatus provide highly satisfactory constant-luminance operation on an average basis during successive field scans.

It is an object of the invention, therefore, to provide a new and improved color-image-reproducing apparatus for a constant-luminance receiver which avoids one or more of the above-mentioned disadvantages of prior such apparatus.

It is another object of the invention to provide a new and improved color-image-reproducing apparatus for a constant-luminance receiver which imparts thereto a substantially reduced resultant luminance response to undesired signal components which tend to degrade the constancy of luminance.

It is another object of the invention to provide a new and improved color-image-reproducing apparatus for a constant-luminance receiver which substantially reduces the resultant luminance response of the receiver to undesired signal components which tend to cause luminance streaks across the color image.

In accordance with a particular form of the invention, there is provided a new and improved screen structure for color-image-reproducing apparatus in a color-television receiver of the constant-luminance type, subject to undesired signal components which tend to degrade the constancy of luminance, for supplying a received composite video signal including a component primarily representative of the luminance of a composite color image to be reproduced and at least two components jointly primarily representative of the chrominance of the image. The screen structure comprises cathode-ray color-image-reproducing means having a predetermined field-scanning period and responsive to the luminance and chrominance components and including at least three types of cathode-ray-responsive fluorescent image-display light sources in spaced display areas and all of the light sources having light-persistence time constants differing from each other by a minor fraction of the aforesaid period for developing at least three color images individually representative of predetermined primary colors of the aforesaid image and jointly representative of the composite image, thereby reducing the resultant luminance response of the receiver to the undesired signal components.

Also in accordance with the invention, there is provided a new and improved screen structure for color-image-reproducing apparatus in a color-television receiver of the constant-luminance type, subject to undesired signal components which tend to degrade the constancy of luminance, for supplying a received composite video signal including a component primarily representative of the luminance of a composite color image to be reproduced and at least two components jointly primarily representative of the chrominance of the image. The screen structure comprises cathode-ray color-image-reproducing means responsive to the luminance and chrominance components and including at least three types of cathode-ray-responsive fluorescent image-display materials in spaced display areas and all of the fluorescent materials having light-persistence time constants differing from each other by not substantially more than the mean value thereof for developing at least three color images individually representative of predetermined primary colors of the aforesaid image and jointly representative of the composite image, thereby reducing the resultant luminance response of the receiver to the undesired signal components.

One embodiment of the invention includes a cathode-ray tube having red, green, and blue phosphorescent image-display elements having substantially equal light-persistence time constants. It will be shown that in this embodiment the use of such a cathode-ray tube in a constant-luminance type of color-television receiver reduces the luminance flicker between successive scanning fields which would otherwise undesirably be present due to limitations of cathode-ray tubes usually employed.

For a better understanding of the present invention, together with other and further objects thereof, reference is had to the following description taken in connection with the accompanying drawings, and its scope will be pointed out in the appended claims.

In the accompanying drawings:

Fig. 1 is a circuit diagram, partly schematic, of a constant-luminance receiver utilizing color-image-reproducing apparatus constructed in accordance with the invention;

Fig. 1*a* is a diagrammatic representation of a portion of the color-image-reproducing apparatus of the Fig. 1 receiver;

The term "luminance," as used herein and in the appended claims, refers to the luminous intensity of a surface in a given direction per unit of projected area of the surface as viewed from that direction.

The term "brightness," as used herein, is that attribute of visual perception in accordance with which an area appears to emit more or less light.

The term "chromaticity," as used herein and in the appended claims, is that color quality of light definable by its dominant wave length and its purity taken together.

The term "predetermined primary color," as used herein and in the appended claims with reference to a color image, is defined by predetermined dominant-wave-length and purity factors and by a variable intensity factor determined by the image. Further, the primary colors individually represent distinct regions of the visible spectrum and thus jointly substantially represent the color of the image. No primary color of a selected set of primary colors can be matched by a combination of any other primary colors of the set.

The term "composite video signal," as used herein and in the appended claims, refers to a signal including luminance and chromaticity components jointly representative of a composite color image. The composite video signal may, for example, be considered as a video-frequency or radio-frequency signal.

The term "modulated subcarrier-signal component" represents that signal component comprising a generated subcarrier wave signal modulated by at least two components jointly primarily representative of the chromaticity of the composite color image to be reproduced.

The phrase "undesired signal components which tend to degrade the constancy of luminance," as used herein and in the appended claims, refers to signal components, for example, certain noise components which ordinarily degrade an instantaneous aspect of the constancy of luminance in constant-luminance receivers utilizing color-image-reproducing apparatus heretofore proposed.

GENERAL DESCRIPTION OF FIG. 1 COLOR-TELEVISION RECEIVER

Figures 1, 1A:
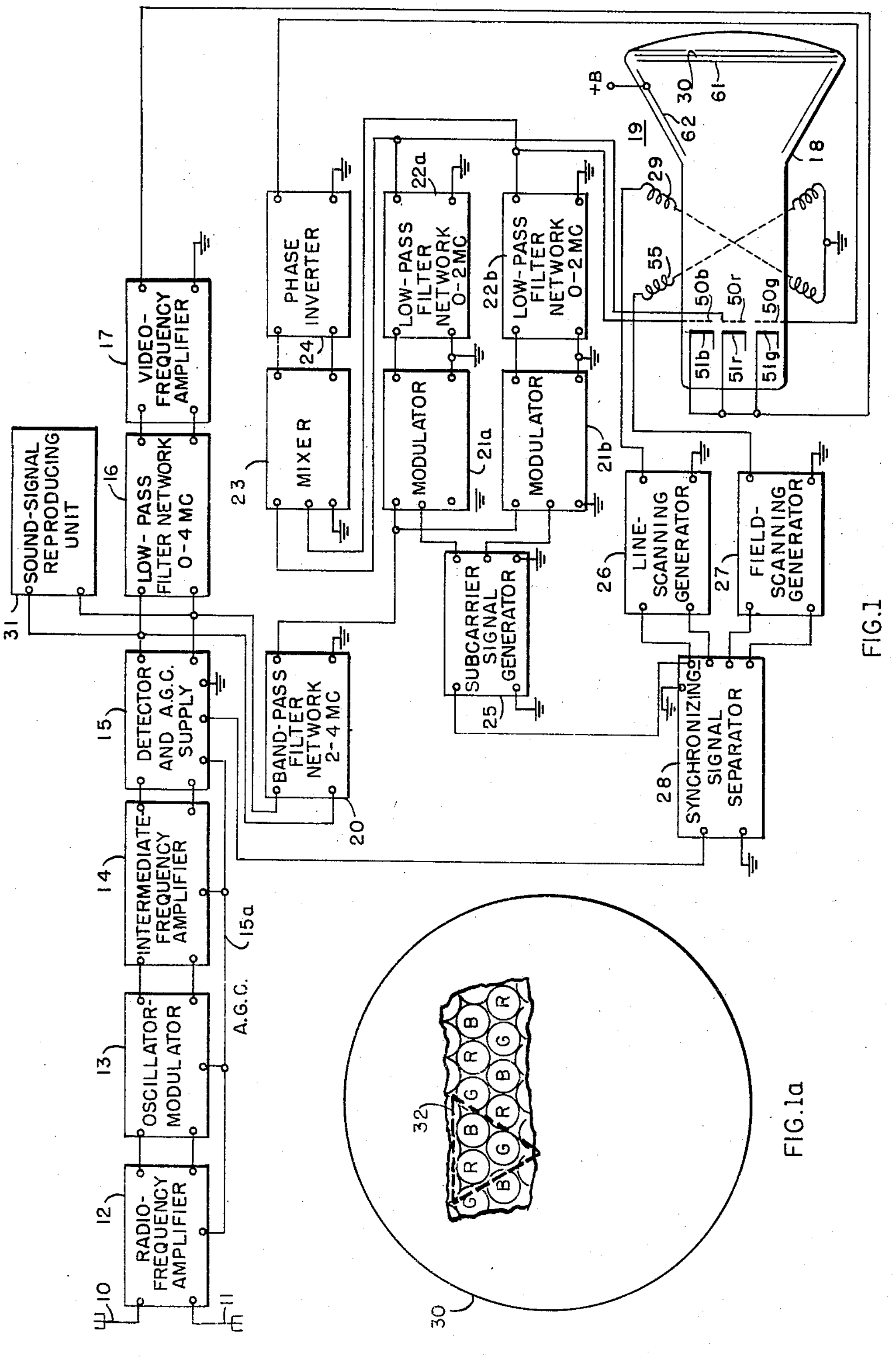

Referring now more particularly to Fig. 1 of the drawings, there is represented a color-television receiver of the constant-luminance type subject to undesired signal components which tend to degrade the constancy of luminance for deriving from a received composite video signal a component primarily representative of the luminance of a composite color image to be reproduced and at least two components jointly primarily representative of the chromaticity of that image. The receiver includes an antenna system 10, 11, a radio-frequency amplifier 12 of one or more stages, an oscillator-modulator 13, an intermediate-frequency amplifier 14 of one or more stages, and a detector and AGC supply 15, coupled in cascade and in the order named, for receiving a wave signal modulated by video-frequency components representative of a composite color image and for deriving the video-frequency components from the received signal. The AGC supply of the unit 15 is connected to the input circuits of one or more of the stages of the units 12–14, inclusive, by a control circuit conductor **15*a***.

There is connected to the detector and AGC supply 15 a first signal-translating channel responsive to the video-frequency signal components for translating preferably the frequency band of 0–4 megacycles which comprises the component primarily representative of the luminance of the composite color image to be reproduced. Specifically, this channel comprises a low-pass filter network 16 having a pass band of 0–4 megacycles connected to the input circuit of a video-frequency amplifier 17 for amplifying the luminance component. The amplifier 17 is connected to the common cathode portion of the control electrode-cathode input circuits **50*r*, 51*r*, 50*b*, 51*b*, 50*g*, 51*g*, of a triple-gun cathode-ray tube 18 included in color-image-reproducing apparatus 19** constructed in accordance with the invention and more particularly described hereinafter.

There is also connected to the output circuit of the detector of the unit 15 a second signal-translating channel responsive to the modulated subcarrier signal component of the composite video signal for supplying at least two components jointly primarily representative of the chromaticity of the composite color image to be reproduced. This channel includes in cascade a band-pass filter network 20 having a pass band of, for example, 2–4 megacycles and a pair of modulators **21*a*, 21*b*, also known as synchronous detectors or demodulators, having input circuits connected in parallel to the network 20 and having output circuits connected to a pair of low-pass filter networks 22*a*, 22*b*, respectively, which have individual pass bands of 0–2 megacycles for supplying two video-frequency chromaticity components. The modulators 21*a* and 21*b* are devices of the type which derives the modulation components of an applied wave signal by utilizing a locally generated wave signal which is in synchronism with and at a predetermined phase with respect to the applied wave signal. The modulators 21*a* 21*b*** may, for example, except for operating frequencies, each have a circuit similar to that represented in Fig. 2, page 569 of an article by Harris entitled, "Selective Demodulation," published in the June, 1947 Proceedings of the I.R.E.

The output circuits of the networks **22*a*, 22*b* are coupled to a mixer 23 comprising a conventional adder circuit and to a phase inverter 24 for deriving a third video-frequency chromaticity component from the two chromaticity components supplied thereto by the filter networks 22*a* and 22*b*. The output circuits of the filter networks 22*a* and 22*b* and the phase inverter 24 are individually connected to the control electrode-cathode circuits of the cathode-ray tube 18** for applying the chromaticity components thereto.

The relative gains of the modulators **21*a*, 21*b* and the mixer 23 and phase inverter 24 and the proportions of the output signals of the networks 22*a* and 22*b* combined in the mixer 23** preferably are predetermined to impart to the chromaticity components relative polarities and intensities which provide therefor substantially zero resultant luminance value in addition to providing the proper signal relations for reproducing a desired composite color image.

The receiver also includes a subcarrier wave-signal generator 25 of, for example, conventional phase-controlled oscillator or high-Q resonant circuit design. The generator 25 has a pair of output circuits individually connected to the modulators 21*a*, 21*b* for providing two unmodulated subcarrier signals having a frequency of, for example, approximately 3.58 megacycles and having, for example, 90° phase relations to each other for individually beating with the modulated subcarrier signal component applied to the modulators 21*a*, 21*b* by the filter network 20 to derive in the modulators the previously mentioned video-frequency chromaticity signal components for subsequent application to the color-image-reproducing apparatus 19.

An output circuit of the detector and AGC supply 15 is coupled to the input circuits of a line-scanning generator 26 and a field-scanning generator 27 through a synchronizing-signal separator 28 for deriving the line-synchronizing, field-synchronizing, and subcarrier-synchronizing signals from the video-frequency signal applied thereto by the unit 15. Two output circuits of the line-scanning generator 26 and field-scanning generator 27 are connected in a conventional manner to scanning windings 29 and 55, respectively, of the cathode-ray tube 18. An output circuit of the synchronizing-signal separator 28 is also connected to the subcarrier wave-signal generator 25 for synchronizing the operation thereof.

The television receiver also includes a sound-signal reproducing unit 31 of conventional construction connected to the output terminals of the detector and AGC supply 15 and comprising the usual sound-intermediate frequency amplifier, frequency detector, audio-frequency amplifier, and loudspeaker. The various units of the Fig. 1 receiver thus far described with the exception of the color-image-reproducing apparatus 19 may be of conventional construction and operation so that a detailed description of the explanation of the operation thereof is unnecessary herein.

*Operation of Fig. 1 color-television receiver*

Considering briefly, however, the operation of the Fig. 1 receiver as a whole, a modulated television wave signal intercepted by the antenna system 10, 11 is selected and amplified in the radio-frequency amplifier 12 and then is applied to the oscillator-modulator 13 wherein it is converted to an intermediate-frequency signal. The intermediate-frequency amplifier selectively amplifies the intermediate-freqency signal and supplies that signal to the detector of the unit 15 which derives the modulation components thereof comprising a video-frequency signal. The luminance component of the video-frequency signal comprising frequency components in a band of 0–4 megacycles is translated through the low-pass filter network 16 and the video-frequency amplifier 17 to the color-image-reproducing apparatus 19 for utilization in a manner more fully to be explained hereinafter.

For the purpose of developing color images in the color-image-reproducing apparatus 19 a modulated subcarrier signal component in the frequency band of 2–4 megacycles of the video-frequency signal derived by the detector of unit 15 is translated through band-pass filter network 20 and applied to the modulators 21*a*, 21*b*. The subcarrier output signals of the subcarrier wave-signal generator 25 beat with the modulated subcarrier signal component in the modulators 21*a*, 21*b* to develop in the individual output circuits thereof separate signals individually including 0–2 megacycle frequency bands comprising the modulation components of the modulated subcarrier signal component and representing the chromaticity components of two predetermined primary colors of the composite color image to be reproduced, for example, the red and blue chromaticity components. The red and blue chromaticity components derived by the modulators 21*a*, 21*b* then are translated through the low-pass filter networks 22*a*, 22*b* to the input circuits of the mixer 23 which combines the proper proportions of the red and blue chromaticity components to develop in its output circuit a signal representative of a third, for example, the green chromaticity component required for tricolor reproduction of a composite color image, as more fully explained hereinafter and also explained in the above-mentioned Electronics article. The red, blue, and green chromaticity components then effectively are individually combined in the color-image-reproducing apparatus 19 with the luminance component applied thereto to provide signals individually representative of the intensities of predetermined primary colors of the image to be reproduced, as will be more fully explained subsequently.

The synchronizing-signal components of the video-frequency signal developed in the output circuit of the unit 15 are separated from the luminance and chromaticity signal components in the separator 28 and are applied to the line-scanning and field-scanning generators 26 and 27 to synchronize the operation thereof. These generators preferably supply signals of saw-tooth wave form for application to the deflection circuits of the color-image-reproducing apparatus 19 to control the line-scanning and field scanning operations thereof. The synchronizing-signal separator 28 also derives a synchronizing signal comprising, for example, several cycles of unmodulated subcarrier reference signal, for controlling the phases of the output signals of the generator 25 in a conventional manner.

The automatic-gain-control or AGC signal derived in the unit 15 is effective to control the amplification of one or more of the stages of the units 12–14, inclsive, to maintain the signal input to the detector of the unit 15 within a relatively narrow range for a wide range of received signal intensities.

In accordance with the operating principles of an intercarrier television receiver, the sound-intermediate frequency signal supplied by the intermediate-frequency amplifier 14 beats in the detector of the unit 15 with the picture intermediate-frequency signal to derive a second sound-intermediate frequency signal in the detector output circuit. This sound-intermediate frequency signal is amplified in the unit 31 and the audio-frequency modulation components thereof are derived and converted into sound in a conventional manner.

Figure 2:
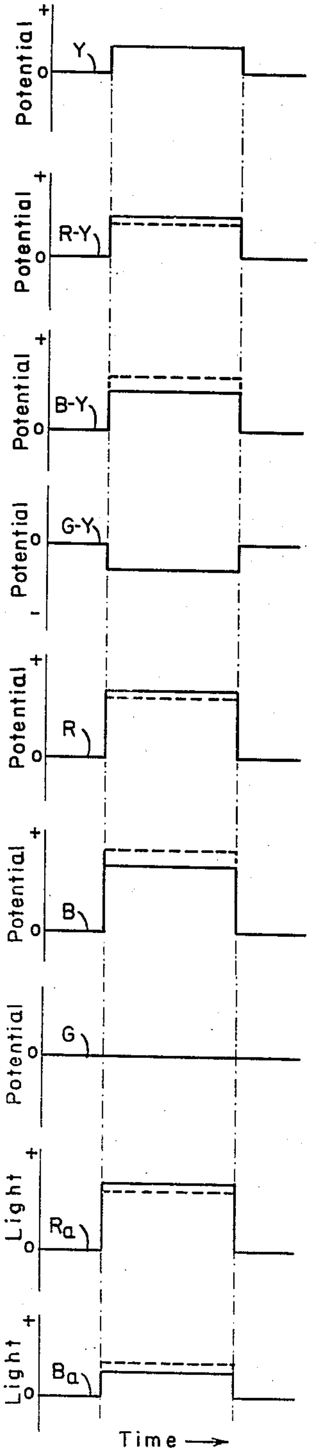
Fig. 2 is a graph representing the amplitude-time characteristics of signals developed at various points of the Fig. 1 receiver under stated operating conditions.

The constant-luminance aspect of the general operation of the Fig. 1 receiver may be more fully understood by the consideration of an example with reference to Fig. 2, which is a graph represeting the amplitude-time characteristics of signals developed at various points of the Fig. 1 receiver when the image to be reproduced comprises a saturated magenta bar extending normal to the direction of line scan on the face of the cathode-ray tube 18 and bounded by a pair of parallel black bars. The reproduction of a saturated magenta bar requires the presence of red and blue primary light signals and the absence of a green primary light signal. During the reproduction of such a magenta bar, the luminance component of the video-frequency output signal of the amplifier 17 during one line scan comprises, for example, a signal represented by curve Y of Fig. 2. This signal component has zero amplitude at the initial and terminal portions thereof corresponding to the black bars to be reproduced and has an amplitude at the central portion thereof determined by the luminance of the magenta bar to be reproduced.

Solid-line curves $R-Y$ and $B-Y$ of Fig. 2 represent the red and blue chromaticity output signal components of the low-pass filter networks 22*a* and 22*b*, respectively. Predetermined proportions of these signal components are combined in the mixer 23 and applied to the phase inverter 24 which derives a green chromaticity signal represented by curve $G-Y$. The signals represented by curves $R-Y$, $B-Y$, and $G-Y$, also known as color-difference signals, have relative values dependent on the dominant wave length and purity of the magneta bar to be reproduced. The red, blue, and green chromaticity signal components $R-Y$, $B-Y$, and $G-Y$ have predetermined relative polarities and intensities which provide therefor substantially zero resultant luminance value and are applied to the control electrode-cathode circuits 50r, 51r, 50g, 51g, 50b, 51b, respectively, of the three-gun cathode-ray tube 18 where they are individually combined with the luminance signal component applied to the common cathode portion of the control electrode-cathode circuits by the amplifier 17 to develop in the individual control electrode-cathode circuits red, blue, and green signals, indicated by solid-line curves R, B, and G of Fig. 2 and representative of red, blue, and green primary color components of the magenta bar to be reproduced.

The signals represented by curves R and B may, for example, have substantially equal amplitudes while the signal represented by curve G has zero amplitude because the magenta bar to be reproduced comprises red and blue primary colors. The red and blue signals developed in the control electrode-cathode circuits of the tube 18 cause the average luminance of the red and blue light signals developed at the display screen of the cathode-ray tube 18 approximately to assume the ratio of, for example, 2.7:1 in accordance with the predetermined luminance values of the signals representative of the selected primary colors in effecting the reproduction by the apparatus 19 of the composite color image. Because the green signal has zero amplitude, no green light signal is developed under the assumed operating conditions.

Consider now, for example, that noise causes a misphasing of the subcarrier wave signal generated by the unit 25 by interfering with the synchronizing signal applied thereto. The amplitude of the red chromaticity signal component $R-Y$ may then, for example, decrease, as indicated by the broken line for curve $R-Y$ on the Fig. 2 graph. As is more fully explained in the above-mentioned I.R.E. article, the modified amplitude of the red chromaticity component $(R-Y)'$ may be represented by the following equation:

$$(R-Y)'=(R-Y)\cos\theta-\frac{(B-Y)}{K}\sin\theta \qquad (1)$$

where

R—Y represents the original amplitude of red chromaticity component

B—Y represents the original amplitude of blue chromaticity component $\theta$ represents the angular misphasing of subcarrier wave signal K represents the ratio of gain of blue chromaticity component-translating circuit 21b, 22b to gain of red chromaticity component-translating circuit 21a, 22a, and 1/K represents the ratio of gains of corresponding channels of color-television transmitter (not shown).

When the amplitude of the red chromaticity component decreases, the amplitude of the blue chromaticity component $B-Y$ increases, as indicated by broken-line curve $B-Y$ on the Fig. 2 graph. The modified amplitude of the blue chromaticity component $(B-Y)'$ may be represented by the following equation:

$$(B-Y)'=K\left(\frac{(B-Y)}{K}\right)\cos\theta+K(R-Y)\sin\theta \qquad (2)$$

During the reproduction of a magenta bar, the variation of the green chromaticity component $G-Y$ is relatively small and, for simplicity of explanation, will not be considered in detail. The modified amplitude of the green chromaticity $(G-Y)'$ may be represented by the following equation:

$$(G-Y)'=-[K'(R-Y)'+K''(B-Y)'] \qquad (3)$$

where

K′ and K″ represent the relative proportions of the red and blue chromaticity components, respectively, combined in the mixer 23.

The amplitude variations of the red and blue chromaticity components $R-Y$ and $B-Y$ cause corresponding variations of the resultant red and blue signals, as represented by dashed lines on curves R and B of Fig. 2. From Equations 1 and 2 it may be shown that because of the gain ratio K between the blue and red chromaticity component-translating circuits 21a, 22a and 21b, 22b, respectively, when small angles $\theta$ of misphasing of the generated subcarrier wave signal occur during the reproduction of the magenta bar, the amplitude variation of the red chromaticity component is approximately equal to the term $$\frac{B-Y}{K}\theta$$

and the amplitude variation of the blue chromaticity component is approximately equal to the term K $(R-Y)\theta$. Since the components $R-Y$ and $B-Y$ have equal amplitudes during the reproduction of the magenta bar, the amplitude variation of the blue chromaticity component is approximately equal to the product of $K^2$ by the amplitude variation of the red chromaticity component. The factor $K^2$ may, for example, be approximately equal to the ratio of the red to blue luminance-transducing efficiencies of the cathode-ray tube 18 of the Fig. 1 receiver under consideration. Accordingly, amplitude variations of the red and blue chromaticity components $R-Y$ and $B-Y$ cause the red and blue light signals developed by the cathode-ray tube 18 during a given field scan to have average luminance variations of approximately equal intensities but opposite polarities. The average luminances of the red and blue light signals developed by the signals of curves R and B are represented by curves R*a* and B*a* with the average luminance variations thereof represented in broken-line construction. One over-all effect of the proportioning of the parameters of the Fig. 1 receiver, therefore, is a substantial reduction in average luminance variations during a given field scan caused by noise interference in the chromaticity channel of the receiver.

It will be recognized, of course, that during the reproduction of colors other than magenta, the luminance variation of the green light signal developed by the cathode-ray tube 18 may contribute a major portion of the total luminance variation. Moreover, even under the operating conditions just described, the resultant cancellation of luminance variations caused by amplitude variations of the chromaticity components is effected by a combination of the red, green and blue light signals developed by the cathode-ray tube 18 although the contribution of the green light signal has not been considered in detail in the foregoing explanation for the sake of simplicity.

The composition of the luminance-signal component heretofore proposed for translation by one type of constant-luminance receiver is given by the following equation:

$$Y=.30R+.59G+.11B \qquad (4)$$

where

Y represents the amplitude of the video-frequency luminance component

R, G, and B represent the amplitudes of the video-frequency signals applied to the color-image-reproducing apparatus to develop red, green, and blue light signals, respectively.

The factors .30, .59, and .11 represent the relative luminance values of the red, green, and blue chromaticity signals, respectively, in effecting the reproduction of a composite color image.

The video-frequency signal proposed for translation by a constant-luminance receiver of the type just mentioned comprises synchronizing components plus picture components represented by the following equation:

$$V=\frac{R-Y}{1.14}\cos\omega t+\frac{B-Y}{2.03}\sin\omega t+Y \quad (5)$$

where

V represents the amplitude of the video-frequency picture-signal components
$R-Y$ represents the amplitude of the video-frequency red chromaticity-signal component
$B-Y$ represents the amplitude of the video-frequency blue chromaticity-signal component
$\omega t$=angular frequency of the subcarrier signal component.

Note that Equation 4 can be rewritten in the form:

$$G-Y=-[.51(R-Y)+.19(B-Y)] \quad (6)$$

where $G-Y$=the amplitude of the green chromaticity-signal component.

Accordingly, when proportioning the Fig. 1 receiver for operation in response to signals defined, for example, by Equations 4–6, inclusive, in order that the mixer 23 may properly derive the green-chromaticity-signal component from the red and blue chromaticity components supplied thereto by the filter networks **22*a* and 22*b*, the mixer input circuit should be so proportioned that the relative fractions of the red and blue chromaticity signals indicated by Equation 6 are combined therein. Moreover, the red and blue chromaticity signal-translating channels comprising the modulators 21*a* and 21*b*, respectively, preferably have relative gains of 1.14 and 2.03, respectively. It can be demonstrated in a manner similar to that previously explained that when the modulators 21*a* and 21*b*** have such relative gains, the video-frequency red, green, and blue chromaticity components $R-Y$, $G-Y$, and $B-Y$, respectively, have substantially zero resultant luminance value.

*Description of color-image-reproducing apparatus*

The color-image-reproducing apparatus 19 of the Fig. 1 receiver comprises circuit means for translating a component primarily representative of the luminance of a composite color image to be reproduced and at least two components jointly primarily representative of the chromaticity of the image with the chromaticity components of predetermined relative polarities and intensities which provide therefor substantially zero resultant luminance value. More particularly, this circuit means preferably comprises modulators **21*a*, 21*b*, filter networks 22*a*, 22*b*, mixer 23, and phase inverter 24** for imparting to the chromaticity components relative polarities and intensities predetermined in accordance with the relative average luminance values thereof in effecting the reproduction by the apparatus of predetermined primary colors of the image to provide for the chromaticity components substantially zero resultant luminance value as previously explained.

The color-image-reproducing apparatus also comprises cathode-ray image-reproducing means having a predetermined field-scanning period and coupled to the signal-component-translating circuit means and including at least three cathode-ray-responsive fluorescent-substance image-display areas having persistence time constants differing from each other by a minor fraction of the field-scanning period for developing at least three color images individually representative of predetermined primary colors of the image to be reproduced and jointly representative of the composite image, thereby reducing the resultant luminance response of the receiver to undesired signal components. The image-reproducing means preferably comprises a single cathode-ray tube 18 which, as mentioned previously, may have a triple-gun structure of conventional construction. The tube 18 also includes the usual additional electrodes (not shown) for focusing and accelerating individual cathode-ray beams and an anode 62 which is connected to a high-potential source +B. A suitable aperture mask 61 is disposed adjacent the face end of the tube in close proximity to a tricolor display screen 30. A gun structure and other structural details suitable for use in the cathode-ray tube 18 are described in an article entitled, "Three-Beam Guns for Color Kinescopes" by Moodey and Van Ormer and in an article entitled, "A Three-Gun Shadow-Mask Color Kinescope" by Law in the October 1951 issue of the Proceedings of the I.R.E.

An enlarged fragmentary portion of the display screen 30 is represented in Fig. 1*a*. The display screen preferably includes red, green, and blue light-emissive phosphors disposed in a triangular dot formation, as indicated in Fig. 1*a* by dots R, G, and B, respectively. Each group, such as that represented in a broken-line triangle 32 and comprising a red, green, and blue light-emissive phosphor dot, represents an elemental composite-color area of the reproduced composite image. As will be more fully explained hereinafter, it is desirable that the time constants of the red, green, and blue light-emissive phosphors utilized on the display screen 30 differ from each other by less than one-tenth the field-scanning perod of the apparatus 19 and preferably are substantially equal. The time constants of the three phosphors may, for example, be short relative to a field-scanning period, that is, the time constants may have values less than one-tenth the period. The time constants may also be proportioned to have values less than the field-scanning period and values which differ from each other by not substantially more than the mean value thereof.

The stimulus-response decay characteristics of some known phosphors commonly employed in cathode-ray tubes are approximately defined by the following exponential-type equation:

$$L=A\epsilon^{\frac{-t}{b}} \quad (7)$$

where

L represents the instantaneous light emission of the phosphor expressed in lumens
A represents the maximum light emission of the phosphor expressed in lumens
$b$ represents the persistence time constant of the phosphor expressed in seconds
$t$ represents time expressed in seconds.

In accordance with definitions usually employed in connection with exponential variations, therefore, the persistence time constant of a phosphor may be considered as the time required for the light emission of the phosphor, expressed, for example, in lumens, to fall to approximately 37 percent. of its maximum value.

The stimulus-response decay characteristics of other known phosphors commonly employed in cathode-ray tubes approximately vary in accordance with a hyperbolic function. For the purposes of this specification and claims, the persistence time constant of such a phosphor may also be considered as the time required for the light emission of the phosphor, expressed, for example, in lumens to fall approximately 37 percent. of its maximum value. In the event that the hyperbolic decay function varies in response to variations of stimulus, the persistence time constant may be considered as the time constant corresponding to the characteristic responsive to an average stimulus during normal picture reproduction.

*Operation of color-image-reproducing apparatus*

Considering now the operation of the color-image-reproducing apparatus 19, reference will be made initially to certain operating fundamentals of cathode-ray tube picture reproduction. The video-frequency signal components representing the composite color image applied to the control electrode-cathode circuits of a cathode-ray image-reproducing tube ordinarily extend over a range of 0–4 megacycles, as mentioned previously, The modulation information represented by the 0–4 megacycle range of signal components is necessary to reproduce a composite color image on a cathode-ray tube display screen which includes over 200,000 elemental composite color-picture areas, each comprising, for example, red, green, and blue phosphor dots, such as enclosed in the triangle 32 of Fig. 1*a*. Because of the scanning operation of the cathode-ray beam within the cathode-ray tube, the modulation information represented by the 0–4 megacycle range of signal components is distributed among the total number of elemental picture areas. Once during each field scan when reproducing colors requiring the presence of three primary color components each of the phosphors of an elemental area receives a pulse-type stimulus resulting from impingement of the cathode-ray beam thereon. The phosphors of an elemental area then emit light during periods determined by the persistence time constants thereof.

The frequency range of the modulation components of the light signals emitted by the phosphors of an elemental composite-color area extends from 0–30 cycles when the field-scanning frequency is, for example, 60 cycles. In the event that the receiver utilizes an interlaced scanning system, a pair of elemental areas on adjacent lines, considered as a unit, is scanned at a 60-cycle rate. This pair of elemental areas may be considered as a unit because the high-frequency components, for example, the 30-cycle components, of the light signals developed at these areas cannot be fully resolved into individual components by the human eye and, therefore, the effect on the eye is the same as if each area were scanned at a 60-cycle rate. Accordingly, the modulation components of the light signals developed at such a pair of elemental areas in an interlaced scanning system also vary over a range of 0–30 cycles.

As will be more fully explained subsequently, the relative phases and amplitudes of the high-frequency modulation components, for example, the 30-cycle modulation components, of the light signals developed at the elemental phosphor area in response to signals of predetermined amplitude and phase applied to the cathode-ray tube are determined by the persistence time constants of the phosphors.

Figure 3:
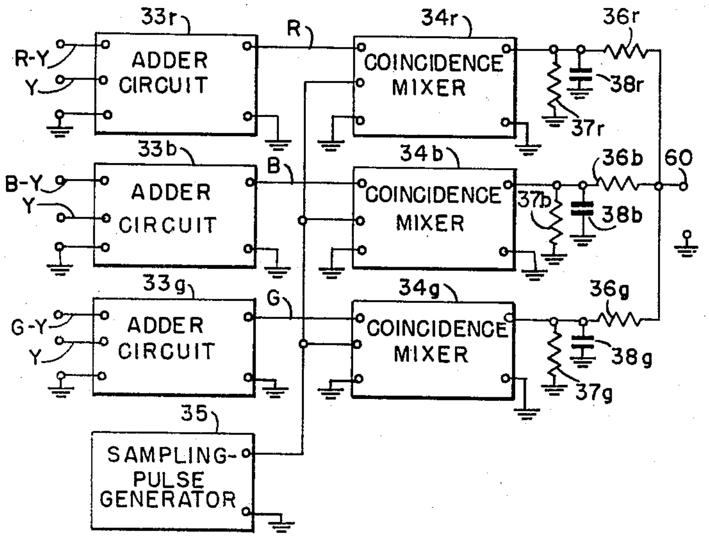
Fig. 3 is a circuit diagram of an electrical analogue of a portion of the color-image-reproducing apparatus of the Fig. 1 receiver.

Referring now to Fig. 3 of the drawings, the circuit there represented is an electrical analogue of a portion of the cathode-ray tube 18 which stimulates at a 60-cycle rate a predetermined elemental composite-color area of the phosphor screen thereof, such as that enclosed in the triangle 32 of Fig. 1*a*. Adder circuits 33*r*, 33*b*, and 33*g* of the Fig. 3 circuit correspond to the control electrode-cathode circuits 50*r*, 51*r*, 50*b*, 51*b*, 50*g*, 51*g* of the cathode-ray tube 18. Accordingly, red, blue, and green chromaticity signal components $R-Y$, $B-Y$, and $G-Y$ applied to the adder circuits 33*r*, 33*b*, and 33*g*, respectively, combine with the luminance component Y, also applied to the adder circuits, to derive red, blue, and green video-frequency color signals corresponding to the modulation components of the three cathode-ray beams of the tube 18 of the Fig. 1 receiver. The video-frequency color signals R, B, and G derived by the adder circuits 33*r*, 33*b*, and 33*g*, respectively, are applied to the input circuits of normally nonconductive coincidence mixers 34*r*, 34*b*, and 34*g*, respectively, which are pulsed into conduction at a 60-cycle rate by the output signal of a sampling-pulse generator 35. The sampling-pulse generator 35 and the coincidence mixers 34*r*, 34*b*, and 34*g* correspond to the scanning circuits of the cathode-ray tube 18 which cause the three cathode-ray beams thereof individually to impinge the three phosphor dots comprising an elemental area of the display screen 30 at a 60-cycle rate. The coincidence mixers 34*r*, 34*b*, and 34*g* may, for example, be high-impedance devices which may be considered as constant-current pulse generators for present purposes.

Three groups of current pulses recurring at a 60-cycle rate and corresponding to pulses of the three cathode-ray beams developed in the cathode-ray tube 18 are applied by the coincidence mixers 34*r*, 34*b*, and 34*g* of Fig. 3 to resistor-condenser networks 37*r*, 38*r*, 37*b*, 38*b*, and 37*g*, 38*g*, respectively, which correspond to the phosphors of an elemental area of the display screen 30 of the cathode-ray tube 18. For the purposes of this explanation, the charge time constants of the resistor-condenser networks 37*r*, 38*r*, 37*b*, 38*b*, 37*g*, 38*g*, which correspond to the excitation time constants of the red, blue, and green light-emissive phosphors, respectviely, may be considered to be the same as the discharge time constants thereof, which correspond to the persistence time constants of the phosphors, because the charge or phosphor excitation intervals are extremely short relative to the discharge or persistence intervals. The networks 37*r*, 38*r*, 37*b*, 38*b*, and 37*g*, 38*g* are connected to resistors 36*r*, 36*b*, and 36*g*, respectively, which are proportioned in accordance with the relative luminance-transducing efficiencies of the red, blue, and green light-emissive phosphors to provide correspondence between the signal developed at the common terminal 60 of the resistors and the luminance of the composite color light signal developed at an elemental composite color area of the phosphor screen 30 of the Fig. 1 receiver. More particularly, the resistors 36*r*, 36*b*, and 36*g* preferably have relative conductance values of .30, .11, and .59, respectively, which correspond to the coefficients of the red, blue, and green signal components of the luminance signal represented by Equation 4.

Figure 4:
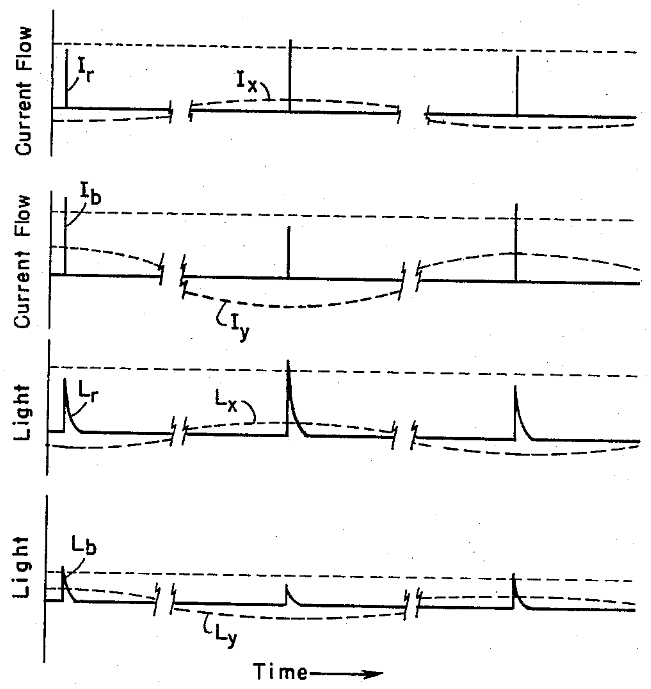
Fig. 4 is a graph representing the amplitude-time characteristics of signals developed at a given area of the display screen of the color-image-reproducing apparatus of the Fig. 1 receiver.

Considering now the light emitted at an elemental area 32 of the display screen 30 of the cathode-ray tube 18 with reference to an analogous operation of the Fig. 3 circuit, assume that the cathode-ray tube 18 reproduces a magenta bar of the type developed by the signals represented in Fig. 2. Under operating conditions such that, for example, noise having an appreciable 30-cycle component causes an amplitude variation of the red and blue chromaticity signals, the resultant red and blue signals developed in the control electrode-cathode circuits of the tube 18 and in the adder circuits 33*r* and 33*b* vary in amplitude at a 30-cycle rate. Curves $I_r$ and $I_b$ of Fig. 4 represent the pulses of the red and blue video-frequency cathode-ray signals which impinge a predetermined elemental composite-color picture area of the cathode-ray tube 18 and also represent the pulses derived by the coincidence mixers 34*r* and 34*b* of the Fig. 3 circuit. The pulses of curves $I_r$ and $I_b$ recur at a 60-cycle rate corresponding to the field-scanning frequency and vary in amplitude at a 30-cycle rate because of the undesired 30-cycle component included in the red and blue video-frequency signals translated by the cathode-ray beam of the tube 18. The 30-cycle components of the pulses of curves $I_r$ and $I_b$, are represented in broken-line construction by curves $I_x$ and $I_y$, respectively, drawn with exaggerated curvature and to an exaggerated scale. These 30-cycle components are of opposite polarity because the pulses of the red signal increase in amplitude while the pulses of the blue signal decrease in amplitude and vice versa for the reasons explained previously in connection with the general operation of the Fig. 1 receiver. As also discussed previously, in considering the reproduction of a magenta bar, the amplitude variation of the green signal will be neglected for the sake of simplicity.

The pulses of the red and blue cathode-ray signals which impinge the red and blue light-emissive phosphors, respectively, of the display screen of the cathode-ray tube 18 may be considered by analogy as current pulses which charge the condensers 38*r* and 38*b*, respectively, of the Fig. 3 circuit. The condensers 38*r* and 38*b* discharge exponentially during intervals of duration determined by the time constants of the resistor-condenser networks 37*r*, 38*r*, 37*b*, 38*b* and corresponding to the persistence time contants of the phosphors. The amplitude of the pulses developed across the condensers 38*r* and 38*b* and attenuated by the resistors 36*r* and 36*b* varies at a 30-cycle rate at terminal 60 and the amplitude of the light pulses developed by the phosphors of the cathode-ray tube 18 varies in a similar manner, as indicated by curves $L_r$ and $L_b$ of Fig. 4 which represent the magnitudes of the light pulses developed by the red and blue light-emissive phosphors of an elemental composite-color area.

The resultant average luminance variations of the red, blue, and green light signals averaged over a field period is substantially zero because of the cancellation of the average luminance variation components resulting from the proportioning of the parameters of the Fig. 1 receiver in accordance with constant-luminance principles previously explained. Additionally, because the persistence time constants of the phosphors are proportioned in accordance with the present invention to have, for example, substantially equal values, the resultant 30-cycle component of the red and blue light signals developed during the reproduction of a magenta bar is approximately zero, as indicated by a comparison of curves $L_x$ and $L_y$ of Fig. 4 which represent the 30-cycle luminance-variation components of the red and blue light signals, drawn with exaggerated curvature and to an exaggerated scale, as having approximately equal amplitudes and opposite polarities. This is because the red and blue phosphors cause substantially equal phase shift and attenuation of the signals modulating the cathode-ray beam in transducing the electrical signal energy to light energy. With reference to the Fig. 3 circuit, the resistor-condenser networks **37*r*, 38*r* and 37*b*, 38*b*** attenuate the 30-cycle components of the signal applied thereto and shift the phase of those components by substantially equal factors.

The phase shift and attenuation of a predetermined frequency component of the signals translated by the red, green, and blue light-emissive phosphors, as a result of the persistence time constants of the phosphors, may be represented by the following equation:

$$\frac{e_2}{e_1}=\frac{1}{1+j\omega t_c} \qquad (8)$$

where $e_1$ represents the amplitude of an applied potential at a given frequency equivalent to the product of the corresponding frequency component of output-current flow of, for example, the coincidence mixer **34*r* by, for example, the resistor 37*r***

$e_2$ represents the amplitude of the potential developed across, for example, the condenser **38*r* in response to potential $e_2$ $\omega$ represents the angular frequency of the signal component under consideration $t_c$ represents the time constant of, for example, the resistor-condenser network 37*r*, 38*r*** (persistence time constant of the corresponding phosphor).

In employing Equation 8 to determine the amplitude and phase shift of given frequency components developed at the various phosphors of the display screen 30 of cathode-ray tube 18, only the persistence time constant of the phosphors need be known since the amplitudes and phase shifts may be determined on a relative basis.

While the foregoing analysis is based on the assumption that the decay characteristics of the phosphors vary in a substantially exponential manner, the similarity between exponential and hyperbolic decay characteristics over an interval of high luminance renders the analysis applicable to an acceptably approximate degree to phosphors having hyperbolic decay characteristics.

As mentioned previously, it has heretofore been common practice to utilize in a color-image-reproducing apparatus of a constant-luminance receiver display-screen phosphors having persistence time constants which differ by factors of 100 to 1,000 and which have a maximum value approximately equal to the field-scanning period. For example, red and green phosphors heretofore utilized have persistence time constants of approximately 20,000 microseconds and 15,000 microseconds, respectively, while the blue phosphor utilized therewith has a time constant in the range of 10 to 160 microseconds. From Equation 8 it may be demonstrated that widely different time constants of such duration result in only a small degree of cancellation of the high-frequency components in the neighborhood of, for example, 30 cycles developed at a given elemental area of the phosphor display screen. On the other hand, when the persistence time constants are, for example, substantially equal in accordance with the present invention, substantially complete cancellation of both high-frequency and low-frequency luminance-variation components occurs.

While applicant does not wish to be limited to any particular circuit constants, the following may be employed in a color-image-reproducing apparatus constructed in accordance with the invention:

| | |
|---|---|
| Green and red phosphors ---- | zinc cadmium sulfide, activated by trace amounts of silver. |
| Blue phosphor ------------ | zinc sulfide, silver-activated, or cadmium silicate. |
| Persistence time constants of green, red, and blue light-emissive phosphors -------- | less than 500 microseconds. |

From the foregoing description it will be apparent that a color-image-reproducing apparatus constructed in accordance with the invention has several advantages. Such color-image-reproducing apparatus causes a substantial reduction of the resultant luminance response of a constant-luminance receiver to undesired signal components which tend to degrade the constancy of luminance, such as high-frequency signal components in the neighborhood of 30 cycles which may be caused, for example, by noise in the synchronizing circuits of the receiver. Moreover, when the color-image-reproducing apparatus utilizes phosphors having short-persistence time constants relative to a field-scanning period, the additional advantage of reduced image blurring is provided because there is negligible light hang-over from one field to the next at a given elemental area of the display screen. Accordingly, rapidly moving portions of the composite color image are more accurately reproduced.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What I claim is:

1. In a color-television receiver of the constant-luminance type, subject to undesired signal components which tend to degrade the constancy of luminance, for supplying a received composite video signal including a component primarily representative of the luminance of a composite color image to be reproduced and three components jointly primarily representative of the chrominance of said image, color-image-reproducing apparatus comprising: color image-reproducing means having a predetermined field-scanning period and responsive to said luminance and chrominance components and comprising a cathode-ray tube including three types of cathode-ray-responsive fluorescent image-display materials in spaced display areas and all of the fluorescent materials having substantially equal light-persistence time constants having values less than one-tenth said period for developing three color images individually representative of predetermined primary colors of said image and jointly representative of said composite image, thereby reducing the resultant luminance response of the receiver to said undesired signal components.

2. In a color-television receiver of the constant-luminance type, subject to undesired signal components which tend to degrade the constancy of luminance, for supplying a received composite video signal including a component primarily representative of the luminance of a composite color image to be reproduced and at least two components jointly primarily representative of the chrominance of said image, color-image-reproducing apparatus comprising: cathode-ray color image-reproducing means having a predetermined field-scanning period and responsive to said luminance and chrominance components and including at least three types of cathode-ray-responsive fluorescent image-display light sources in spaced display areas and all of the light sources having light-persistence time constants differing from each other by a minor fraction of said period for developing at least three color images individually representative of predetermined primary colors of said image and jointly representative of said composite image, thereby reducing the resultant luminance response of the receiver to said undesired signal components.

3. In a color-television receiver of the constant-luminance type, subject to undesired signal components which tend to degrade the constancy of luminance, for supplying a received composite video signal including a component primarily respresentative of the luminance of a composite color image to be reproduced and two components jointly primarily representative of the chrominance of said image and including circuit means for supplying said signal components and for imparting to said chrominance components relative polarities and intensities predetermined in accordance with the relative average luminance values thereof in affecting the reproduction by the apparatus of predetermined primary colors of said image to provide for said chrominance components substantially zero resultant luminance value, color-image-reproducing apparatus comprising cathode-ray color image-reproducing means having a predetermined field-scanning period and coupled to said circuit means and including at least three types of cathode-ray-responsive fluorescent image-display materials in spaced display areas and all of the fluorescent materials having light-persistence time constants differing from each other by a minor fraction of said period for developing at least three color images individually representative of predetermined primary colors of said image and jointly representative of said composite image, thereby reducing the resultant luminance response of the receiver to said undesired signal components.

4. In a color-television receiver of the constant-luminance type, subject to undesired signal components which tend to degrade the constancy of luminance, for supplying a received composite video signal including a component primarily representative of the luminance of a composite color image to be reproduced and at least two components jointly primarily representative of the chrominance of said image, color-image-reproducing apparatus comprising: cathode-ray color image-reproducing means having a predetermined field-scanning period and responsive to said luminance and chrominance components and including at least three types of cathode-ray-responsive fluorescent image-display materials in spaced display areas and all of the fluorescent materials having light-persistence time constants differing from each other by less than one-tenth said period for developing at least three color images individually representative of predetermined primary colors of said image and jointly representative of said composite image, thereby reducing the resultant luminance response of the receiver to said undesired signal components.

5. In a color-television receiver of the constant-luminance type, subject to undesired signal components which tend to degrade the constancy of luminance, for supplying a received composite video signal including a component primarily representative of the luminance of a composite color image to be reproduced and at least two components jointly primarily representative of the chrominance of said image, color-image-reproducing apparatus comprising: cathode-ray color image-reproducing means responsive to said luminance and chrominance components and including at least three types of cathode-ray-responsive fluorescent image-display materials in spaced display areas and all of the fluorescent materials having substantially equal light-persistence time constants for developing at least three color images individually representative of predetermined primary colors of said image and jointly representative of said composite image, thereby reducing the resultant luminance response of the receiver to said undesired signal components.

6. In a color-television receiver of the constant-luminance type, subject to undesired signal components which tend to degrade the constancy of luminance, for supplying a received composite video signal including a component primarily representative of the luminance of a composite color image to be reproduced and at least two components jointly primarily representative of the chrominance of said image, color-image-reproducing apparatus comprising: cathode-ray color image-reproducing means having a predetermined field-scanning period and responsive to said luminance and chrominance components and including at least three types of cathode-ray-responsive fluorescent image-display materials in spaced display areas and all of the fluorescent materials having light-persistence time constants having values less than one-tenth said period for developing at least three color images individually representative of predetermined primary colors of said image and jointly representative of said composite image, thereby reducing the resultant luminance response of the receiver to said undesired signal components.

7. In a color-television receiver of the constant-luminance type, subject to undesired signal components which tend to degrade the constancy of luminance, for supplying a received composite video signal including a component primarily representative of the luminance of a composite color image to be reproduced and at least two components jointly primarily representative of the chrominance of said image, color-image-reproducing apparatus comprising: cathode-ray color image-reproducing means responsive to said luminance and chrominance components and including at least three types of cathode-ray-responsive fluorescent image-display materials in spaced display areas and all of the fluorescent materials having light-persistence time constants differing from each other by not substantially more than the mean value thereof for developing at least three color images individually representative of predetermined primary colors of said image and jointly representative of said composite image, thereby reducing the resultant luminance response of the receiver to said undesired signal components.

8. In a color-television receiver of the constant-luminance type, subject to undesired signal components which tend to degrade the constancy of luminance, for supplying a received composite video signal including a component primarily representative of the luminance of a composite color image to be reproduced and at least two components jointly primarily representative of the chrominance of said image, color-image-reproducing apparatus comprising: cathode-ray color image-reproducing means having a predetermined field-scanning period and responsive to said luminance and chrominance components and including at least three types of cathode-ray-responsive fluorescent image-display materials in spaced display areas and all of the fluorescent materials having light-persistence time constants having values less than said period and differing from each other by not substantially more than the mean value thereof for developing at least three color images individually representative of predetermined primary colors of said image and jointly representative of said composite image, thereby reducing the resultant luminance response of the receiver to said undesired signal components.

References Cited in the file of this patent

UNITED STATES PATENTS 2,682,478 Howse ---------------- June 29, 1954

OTHER REFERENCES

Principles of NTSC Compatible Color Television; Electronics, February 1952, pages 88–95.

Fink: Television Engineering, pages 544–459; received in the Patent Office Lib., March 28, 1952.